United States Patent [19]
Byers, Jr.

[11] Patent Number: 5,249,603
[45] Date of Patent: Oct. 5, 1993

[54] PROPORTIONAL ELECTRO-HYDRAULIC PRESSURE CONTROL DEVICE

[75] Inventor: J. Otto Byers, Jr., Kalamazoo, Mich.

[73] Assignee: Caterpillar Inc., Peoria, Ill.

[21] Appl. No.: 885,994

[22] Filed: May 19, 1992

[51] Int. Cl.$^5$ .......................................... F15B 13/044
[52] U.S. Cl. ................................ 137/625.65; 251/65; 251/129.1
[58] Field of Search ...................... 137/625.65; 251/65, 251/129.1

[56] References Cited

U.S. PATENT DOCUMENTS

| | | | |
|---|---|---|---|
| 3,604,959 | 9/1971 | Sturman | 310/12 |
| 3,740,594 | 6/1973 | Casey | 310/30 |
| 3,774,642 | 11/1973 | Gray | 137/625.65 |
| 4,071,042 | 1/1978 | Lombard et al. | 251/65 X |
| 4,144,514 | 3/1979 | Rinde et al. | 137/625.65 X |
| 4,316,599 | 2/1982 | Bouvet et al. | 137/625.65 X |
| 4,396,037 | 8/1983 | Wilcox | 137/625.65 |
| 4,478,250 | 10/1984 | Lukasczyk et al. | 137/625.65 |
| 4,525,695 | 6/1985 | Sheng et al. | 137/625.65 X |
| 4,605,197 | 8/1986 | Casey et al. | 251/30.01 |
| 4,969,487 | 11/1990 | Suzuki et al. | 137/625.65 |

Primary Examiner—Gerald A. Michalsky
Attorney, Agent, or Firm—David M. Masterson

[57] ABSTRACT

A proportional electrohydraulic pressure control device is disclosed. The device includes a linear motor having a permanent magnet. The magnet is radially magnetized providing first and second oppositely directed magnetic flux paths. A valve body is included which has a fluid supply port, first and second fluid control ports, and a central bore. The central bore defines first and second chambers at opposite ends of the bore. A linearly shiftable spool having first and second ends is disposed in the central bore. The first and second control ports define an annulus communicable with the central bore. A fluid source is communicable with the annulus of the control ports and supplies pressurized fluid to one of the first and second chambers. The fluid pressure in an associated chamber applies an axial force on a respective end of the spool. The spool is positional to a first neutral position causing a minimum fluid pressure at the first control port. Advantageously, the permanent magnetic flux forces are equal and opposite to the pressurized fluid force applied to the first end of the spool, thereby latching the spool at the first neutral position.

14 Claims, 1 Drawing Sheet

PROPORTIONAL ELECTRO-HYDRAULIC PRESSURE CONTROL DEVICE

TECHNICAL FIELD

This invention relates generally to a proportional electro-hydraulic pressure control device and, more particularly, to a proportional electro-hydraulic pressure control device having a plurality of control ports, wherein the initial flow position of each control port is set independent to the other control ports.

BACKGROUND ART

Typical hydraulic systems utilize pilot stages to control large directional control valves. It is also well known to use electrical actuated pilot valves. For example, electrical actuated valves usually have two solenoids, one positioned on either side of the valve, to provide actuation of the spool in two directions. Additionally, the pilot valve may exhibit characteristics which achieve proportional performance, i.e. spool movement which is proportional to an applied current. However, the use of two solenoids per valve makes for a costly and a physically large system.

Casey et al. in U.S. Pat. No. 4,605,197 assigned to Fema Corporation discloses a pilot valve having only one linear motor. The linear force motor uses a permanent magnet. The permanent magnet allows the force motor to actuate the spool bi-directionally. However, the force motor design of Casey does present some problems.

For example, the force motor design of Casey operates as a three position device. For example, upon energization of the force motor the armature may travel to its limit. Alternatively, energization of the motor in the opposite direction causes the armature to travel to its other limit. The third or neutral position occurs when the linear motor is de-energized. In the de-energized condition a pair of springs counterbalance the magnetic force of the permanent magnet to center the armature between two pole pieces. However setting the initial flow position, i.e. positioning the spool lands to a predetermined position relative to the position of the control ports, may be difficult with only one neutral position. Moreover, much of the generated electromagnetic force is used to overcome the heavy force of the centering springs which results in inefficient operation of the force motor.

The present invention is directed to overcoming one or more of the problems as set forth above.

DISCLOSURE OF THE INVENTION

In one aspect of the present invention a proportional electrohydraulic pressure control device is disclosed. The device includes a linear motor having a permanent magnet. The magnet is radially magnetized providing first and second oppositely directed magnetic flux paths. A valve body is included which has a fluid supply port, first and second fluid control ports, and a central bore. The central bore defines first and second chambers at opposite ends of the bore. A linearly shiftable spool having first and second ends is disposed in the central bore. The first and second control ports define an annulus communicable with the central bore. A fluid source is communicable with the annulus of the control ports and supplies pressurized fluid to one of the first and second chambers. The fluid pressure in an associated chamber applies an axial force on a respective end of the spool. The spool is positional to a first neutral position causing a minimum fluid pressure at the first control port. Advantageously, the permanent magnetic flux forces are equal and opposite to the pressurized fluid force applied to the first end of the spool, thereby causing the spool to latch at the first neutral position.

BRIEF DESCRIPTION OF THE DRAWINGS

For a better understanding of the present invention, reference may be made to the accompanying drawings in which.

BEST MODE FOR CARRYING OUT THE INVENTION

Figure 1:
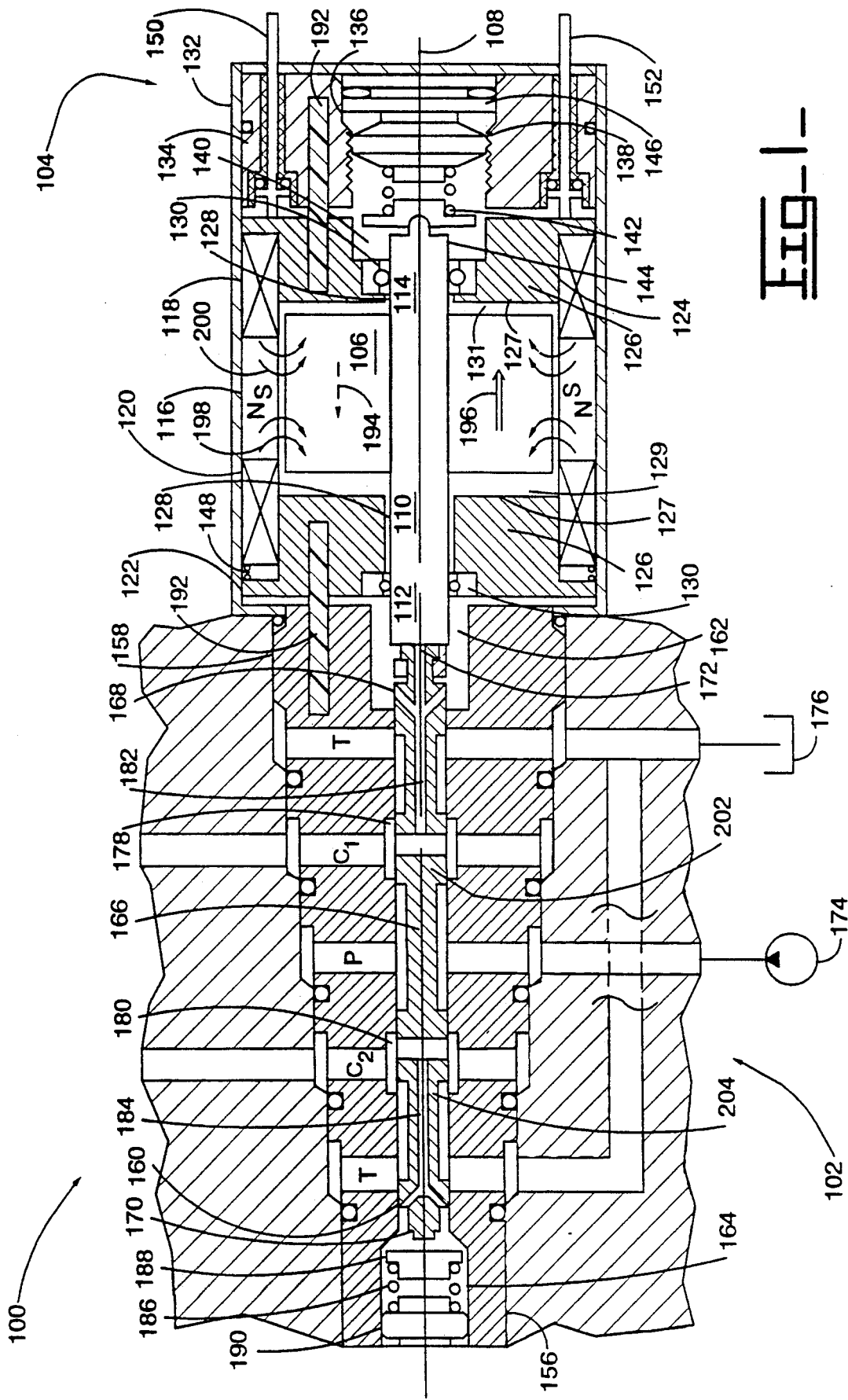
FIG. 1 illustrates a cross-sectional view of a proportional electro-hydraulic pressure control device in accordance with the present invention.

The present invention is well suited toward applications in hydraulic systems which require pilot stages. The present invention is shown in conjunction with reference to FIG. 1., which illustrates a proportional electro-hydraulic 4-way variable pressure device 100. The device 100 may form a pilot stage of a hydraulic system for controlling the movement of a main spool valve. The main spool valve may be used to control the flow of hydraulic fluid to a hydraulic motor, such as a hydraulic cylinder.

The device 100 is essentially comprised of two parts, a hydraulic valve assembly 102 and a linear force motor 104. The linear force motor 104 is a bi-directional electro-magnetic actuator. The linear force motor 104 includes a cylindrical armature 106 of ferromagnetic material bounded by a pair of ends. The armature 106 has a longitudinal axis 108 and is secured to a shaft 110 having first and second ends 112,114. The shaft 110 is formed of a nonmagnetic material and extends axially from the ends of the armature 106. Preferably, the armature has an internal diameter of 0.188 in. or 0.48 cm, an outside diameter of 0.930 in. or 2.36 cm and a length of 1.00 in. or 2.54 cm, for example.

The armature 106 is surrounded by a permanent magnet 116. The permanent magnet 116 has an annular shape having a radial magnetization as noted by poles "N" and "S". The permanent magnet 116 may be made of a single tubular piece or several pieces of arcuate shape which, when assembled, is formed in a substantially tubular shape. The permanent magnet 116 has an integral surface which is closely spaced from an external surface of the armature 106. Preferably the permanent magnet 116 is composed of a Ferrite material grade 7, for example. However, as is well known in the art many other types of permanent magnetic material may be used. Preferably, the permanent magnet may have an internal diameter of 1.00 in. or 2.54 cm., an outside diameter of 1.63 in. or 4.14 cm and a length of 0.75 in. or 1.91 cm, for example. As is well known, the dimensions of the permanent magnet are dependent upon the desired output force of the linear motor.

First and second electromagnetic coil 118,120 of annular shape are positioned on opposite ends of the permanent magnet 116. The coils 118,120 are wound on a non-magnetic core (not shown) of substantial tubular shape. The two coils are electrically connected to one another. Although two coils are shown it is readily apparent that only a single coil may be provided.

Enclosing a combination of the armature 106, magnet 116, and coils 118,120 are a pair of circular plates 122,124 of ferromagnetic material each having inwardly turned bosses 126 defining a journaled opening 128 for reception and support of the shaft 110. The bosses 126 of the circular plates 122,124 include respective pole pieces 127 which terminate the movement of the armature 106. Further, the respective pole pieces 127 of each plate 122,124 are in spaced proximity of the armature 106 thereby forming respective air gaps 129,131. The circular plates 122,124 each have ball bearings 130 disposed in the respective openings 128. A tubular housing or shell 132 encloses the combination and the circular plates 122,124.

The housing 132 includes a circular end plug 134 disposed between a second circular plate 124 and an end of the housing 132. The housing 132, like the circular plates 122,124, is made of ferromagnetic material. The housing 132 includes a first adjusting assembly 136 disposed in a bore 138. The journaled bore of the second circular plate 124 and the bore 138 of the end plug 134 define a working chamber 140. A first adjustable spring 142 having a retainer 144 is disposed in the working chamber 140. Although a coiled spring is shown one skilled in the art can recognize that a leaf or "S" spring may equally be used. The first adjusting assembly 136 is screw-mounted into the bore 138. The first adjusting assembling 136 may include an O-ring seal 146 to prevent contaminants from entering and/or hydraulic oil from exiting the linear motor 104. The position of the first adjustable spring 142 is set such that the retainer 144 contacts the second end 114 of the shaft 110 via the first adjusting assembly 136.

An annular, coiled spring 148 is positioned between the second coil 120 and a first circular plate 122. The spring 148 preloads the combination of the coils 118,120, magnet 116, and circular plates 122,124. Further, the spring 148 separates the first and second circular plates 122,124 in variable position. For example, the separation of the circular plates 122,124 provide for a combined air gap 129,131 of 0.080 in. or 0.20 cm at 100° C. In the preferred embodiment the spring preload is at least equal to the maximum force output of the linear motor 104.

A pair of electrical connectors 150,152 are attached to the first coil 118. The electrical connectors 150,152 supply electrical energy via a current source (not shown) to the coils 118,120.

Accordingly the hydraulic valve assembly 102 consists of a valve body 156 which is affixed through an adapter 158 to the housing 132. The valve body includes a central bore 160 which is axially aligned with the longitudinal axis 108. Further, the central bore defines first and second chambers 162,164 at opposite ends of the central bore 160.

The valve body 156 includes a linearly shiftable spool 166 having first and second ends 168,170. The spool 166 is disposed in the central bore 160 with the first end 168 of the spool 166 being connected to the first end 112 of the shaft 110 via a mechanical coupling 172. The spool 166 has a plurality of axially spaced lands separated by annular grooves.

The valve body 156 has several ports, including two fluid exhaust ports T, two fluid control ports $C_1,C_2$, and a fluid supply port P. The fluid supply port P is connected to a pressure source 174 and supplies a pressurized fluid to the central bore 160 via radially extending bores. The fluid control ports $C_1,C_2$ are connected to a load, such as a main valve or hydraulic motor, and the fluid exhaust ports are connected to a tank 176.

The first and second control ports $C_1,C_2$ each define an annulus 178,180. Additionally, the spool 166 defines a first longitudinally extending passage 182 communicating fluid from the annulus 178 of the first control port $C_1$ to the first chamber 162. Finally, the spool 166 defines a second longitudinally extending passage 184 communicating fluid from the annulus 180 of the second control port $C_2$ to the second chamber 164. Moreover, it may be apparent to those skilled in the art that the annulus may be in the form of a drilled hole, for example.

The valve body 156 includes a second adjustable spring 186, similar to the first adjustable spring 142, having a retainer 188 disposed in the second chamber 164. The valve body 156 further includes a second adjusting assembly 190 similar to the first adjusting assembly 136 such that the second adjusting assembly 190 adjusts the retainer 188 to the second end 170 of the spool 166.

It should be noted that the force rate of the springs 142,186 are higher than the force rate of the permanent magnet 116. Therefore, the springs 142,186 prevents the armature 106 from "latching" to its maximum travel position due to the permanent magnetic force.

Advantageously the device 100 includes a plurality of rods 192 composed of plastic, aluminum or any other thermally expansive material. For example, the rods 192 may consist of a high expansive plastic material with a thermal coefficient of $12 \times 10^{-5}/°C$. The high thermal coefficient nature of the rod material allows the rods 192 to expand at a much higher rate than the steel parts of the motor 104. More particularly, each rod 192 has a predetermined length of 0.990 in. or 2.51 cm at 100° C., for example. The rods are longitudinally positioned in equal spacing about the longitudinal axis 108. More particularly, the adapter 158 and the first circular plate 122 include three longitudinally extending bores spaced 120° about the longitudinal axis 108. Also, the end plug 134 and the second circular plate 124 include three longitudinal extending bores spaced 120° about the longitudinal axis 108. Each of the longitudinal extending bores include a rod 192. The rods 192 load the circular plates 122,124 against the force of the spring 148. Further, as may be readily apparent to those skilled in the art, the rods 192 may be in other shapes or forms—such as a disk, for example.

INDUSTRIAL APPLICABILITY

The intended application of the instant pilot valve is to control fluid pressure to a main spool valve. Advantageously, the pilot valve maintains a minimum fluid pressure to the main spool valve. Preferably, the minimum fluid pressure is less than the fluid pressure required to start movement of the main spool. To best illustrate the advantages of the present invention an example of the device operation will now be described.

When a current of positive magnitude is applied to the coils 118,120, the coils 118,120 energize producing a flux current as indicated by the dashed arrow 194 moving through the armature 106 toward the left, as viewed in FIG. 1, across the first air gap 129 and the pole piece 127 of the first circular plate 122 and returning toward the right through the housing 132 and the second circular plate 124 across the second air gap 131 and back through the armature 106. Conversely, a current of negative magnitude applied to the coils 118,120, produces a flux current as indicated by the double shafted arrow 196 moving through the armature 106 toward the right, as viewed in FIG. 1, across the second air gap 131 and the pole piece 127 of the second circular plate 124 and returning toward the left through the housing 132 and the first circular plate 122 across the first air gap 129 and back through the armature 106. For example, the linear force motor produces a force output of 25 lbs. with a current of 0.6 Amps.

The permanent magnet 116, being a radially magnetized magnet, produces a permanent magnetic flux which moves in paths 198,200 from the center of the motor 104 across the air gaps 129,131 toward the respective pole pieces 127 of the circular plates 122,124 and back through the housing 132 so as to form two circular flux paths. As a consequence, when the electromagnetic coils 118,120 are not energized, the armature 116 is directionally bi-stable in that it will be attracted toward the closest pole piece 127 due to the net magnetic attraction in that direction caused by the lower reluctance in the air gap 129,131 having the smallest length. The flux density from the permanent magnet 116 is equal to or greater than $\frac{1}{2}$ of the maximum combined flux density of the permanent magnet and electromagnet.

The device 100 has two "neutral" positions. That is, when the electromagnetic coils 188,120 are not energized pressure forces in the chambers of the device sufficiently counterbalance the forces of the permanent magnet 116, positioning the spool 166 at one of two "neutral" positions. Advantageously, a neutral position causes a minimum fluid pressure in one of the control ports $C_1,C_2$.

At zero current the spool 166 is biased, via the permanent magnetic force, to either a first or second neutral position. As shown in FIG. 1 the spool 166 is positioned at the first neutral position where the ends of a first land 202 overlap the annulus 178 of the first control port $C_1$. Accordingly, the first adjustable spring 142 is set so that the retainer 144 engages the second end 114 of the shaft 110 while the spool 166 is positioned at the first neutral position. The first neutral position allows the first control port $C_1$ to achieve a minimum fluid pressure. Preferably, the minimum fluid pressure is substantially equal to $\frac{1}{4}$ of the maximum fluid pressure.

For example, pressurized fluid "leaks" from the fluid supply port, P, to the first control port $C_1$ and travels through the first passage 182 to the first chamber 162. Additionally, pressurized fluid flows from the first chamber 162 through spaces within the force motor 104 to the working chamber 140, providing a force balance across the armature 106. The force of the fluid pressure within the chambers 162,140 is axially applied to the first ends of the spool and rod, respectively. Advantageously, the force of the permanent magnet 116 balances the axial force of the fluid pressure within the chambers 162,140, thereby "latching" the spool 166 to the first neutral position. For example, the length of the "working" air gap 131 is adjustable to provide a predetermined magnetic force which is equal to the fluid pressure force. The length of the "working" air gap 131 may be adjusted by shimming the end plug 134 relative to an end of the housing 132.

A second land 204 of the spool 166 is positioned so that the second control port $C_2$ is in communication with the exhaust port T. Thus, the fluid pressure at the other control port $C_2$ is at tank pressure.

A "spike" current in the reverse direction moves the spool 166 to the other neutral position. Accordingly, the second adjustable spring 186 is set so that the retainer 188 engages the first end 168 of the spool 166 while the spool 166 is positioned to the second neutral position (not shown). For example, the ends of the second land 204 overlap the annulus 180 of the second control port $C_2$. The second neutral position creates a minimum fluid pressure at the second control port $C_2$.

For example, pressurized fluid enters the second control port $C_2$ and travels through the second passage 184 to the second chamber 164. The force of the pressurized fluid is axially applied to the second end 170 of the spool 166. Advantageously, the permanent magnetic force balances the pressurized fluid within the chamber 164, thereby "latching" the spool 166 at the second neutral position. For example, the length of the "working" air gap 129 may be adjusted by moving the armature 106 relative to the shaft 110 while the spool 166 is at the second neutral position. Thus, the length of the "working" air gap 129 provides a magnetic force which is equal to the fluid pressure force.

The first land 202 is positioned so that the first control port $C_1$ is open to tank. Thus, the fluid pressure of the first control port $C_1$ is at tank pressure.

Upon applying negative current to the force motor 104, a pilot pressure is generated proportional to the applied current. For example, upon energizing the coils 118,120 in a negative direction the electromagnetic flux path moves in the direction of the arrow 196 aiding the permanent magnetic flux path 200 while weakening the permanent magnetic flux path 198, immediately forcing the armature 116 to the right achieving a desired fluid pressure in the control port $C_1$.

Upon applying positive current to the force motor 104, the electromagnetic flux moves in the direction of the arrow 194 which reenforces the permanent magnetic flux path 198 while weakening the flux path 200, thereby forcing the armature 116 along with the spool 166 to shift proportionally to the left to achieve a desired fluid pressure in the control port $C_2$.

As shown, the present invention yields a variable pressure device which is highly responsive, i.e. fluid flow begins immediately as current is applied to the force motor; is efficient, i.e. substantially all the electromagnetic force is available to perform the required work; is cost effective, i.e. the spool tolerances may be relaxed yielding easier manufacturability.

Other aspects, objects and advantages of the present invention can be obtained from a study of the drawings, the disclosure and the appended claims.

I claim:

1. A proportional electrohydraulic pressure control device having a longitudinal axis, comprising:
   an armature bounded by a pair of ends, a shaft having first and second ends extending axially from the ends of said armature, said armature being rectilinearly translatable along the longitudinal axis;
   a substantially tubular permanent magnet having radial magnetization and being disposed coaxially around said armature, said permanent magnet providing first and second oppositely directed magnetic flux paths;
   an electromagnetic coil being disposed coaxially about said armature and adjacent to said permanent magnet;
   a current source being connected to said electromagnetic coil and adapted to energize said electromagnetic coil, said energized coil producing an electromagnetic flux path which causes said armature to move;

a valve body having a fluid supply port, a fluid exhaust port, first and second fluid control ports, and a central bore being axially aligned with the longitudinal axis and a linearly shiftable spool having first and second ends, said central bore defining first and second chambers at opposite ends of said central bore, said first and second control ports defining an annulus being communicable with said central bore, said spool being disposed in said central bore with the first end of said spool being connected to the first end of said shaft;

a first adjustable spring having a retainer and an adjusting assembly, the second end of said shaft being engageable with the first spring retainer and the first adjusting assembly being adapted to adjust said first adjustable spring to position said spool to a first neutral position that causes a minimum fluid pressure at the first control port, the first permanent magnetic flux path producing a predetermined force counter to the first adjustable spring force for biasing said spool at the first neutral position; and a second adjustable spring having a retainer and an adjusting assembly, the second end of said spool being engageable with the second spring retainer and the second adjusting assembly being adapted to adjust said second adjustable spring to position said spool to a second neutral position that causes a minimum fluid pressure at the second control port, the second permanent magnetic flux path producing a predetermined force counter to the second adjustable spring force for biasing said spool at the second neutral position.

2. A device, as set forth in claim 1, including first and second circular plates having a central opening and being disposed in spaced proximity at opposite ends of said armature, the central opening of said second plate defining a working chamber.

3. A device, as set forth in claim 2, including a fluid source being communicable with the annulus of said control ports and adapted to supply pressurized fluid to said first, second and working chambers, wherein the fluid disposed within said chambers applies axial forces to respective ends of said spool and shaft.

4. A device, as set forth in claim 3, wherein the axial forces applied to the first end of said spool and second end of said shaft effectively equalizes the first permanent magnetic flux force to hold said spool at the first neutral position in response to said electromagnetic coil not being energized.

5. A device, as set forth in claim 4, wherein the axial forces applied to the second end of said spool effectively equalizes the second permanent magnetic flux force to hold said spool at the second neutral position in response to said electromagnetic coil not being energized.

6. A device, as set forth in claim 5, wherein the spool defines a first longitudinally extending passage communicating the annulus of first control port with the first chamber.

7. A device, as set forth in claim 6, wherein said spool defines a second longitudinally extending passage communicating the annulus of the second control port with the second chamber.

8. A device, as set forth in claim 7, wherein said spool has a plurality of lands being separated by annular grooves, each land being bounded by a pair of ends, the ends of a first land overlapping the annulus of the first control port when said spool is positioned at the first neutral position.

9. A device, as set forth in claim 8, wherein the annulus of the second control port is communicable with the fluid exhaust port when said spool is positioned at the first neutral position.

10. A device, as set forth in claim 9, wherein the ends of a second land overlap the annulus of the second control port when said spool is positioned at the second neutral position.

11. A device, as set forth in claim 10, wherein the annulus of the first control port is communicable with the fluid exhaust port when said spool is positioned at the second neutral position.

12. A device, as set forth in claim 8, wherein the force rate of said adjustable springs is greater than the force rate of the permanent magnetic flux paths.

13. A device, as set forth in claim 5, wherein said current source produces a "spike" current to said electromagnetic coil causing said coil to produce an electromagnetic flux path, said electromagnetic flux path being additive to one of the permanent magnetic flux paths and subtractive to the other permanent magnetic flux path causing said spool to shift from one of the neutral positions to the other.

14. A device, as set forth in claim 13, wherein said current source produces a current having a predetermined magnitude to said electromagnetic coil causing said coil to produce an electromagnetic flux path having a magnitude proportional to the magnitude of the applied current, said electromagnetic flux path causing said spool to shift relative to one of the neutral positions to achieve a desired fluid pressure in a respective control port.

* * * * *